(12) United States Patent
Tsai et al.

(10) Patent No.: US 7,253,841 B2
(45) Date of Patent: Aug. 7, 2007

(54) REMOTE CONTROL METHOD OF TILE DISPLAY

(75) Inventors: Whey-Fone Tsai, Hsinchu (TW); Fang-Pang Lin, Hsinchu (TW); Yun-Te Lin, Hsinchu (TW); Yu-Chung Chen, Hsinchu (TW); Yung-Ching Mai, Hsinchu (TW); Shi-Wei Lo, Hsinchu (TW); Tai-Hung Chen, Hsinchu (TW)

(73) Assignees: National Applied Research Laboratories, Hsinchu (TW); National Center for High-Performance Computing, Hsinchu (TW)

( * ) Notice: Subject to any disclaimer, the term of this patent is extended or adjusted under 35 U.S.C. 154(b) by 339 days.

(21) Appl. No.: 10/819,126

(22) Filed: Apr. 7, 2004

(65) Prior Publication Data

US 2005/0225669 A1    Oct. 13, 2005

(51) Int. Cl.
*H04N 5/66* (2006.01)
*H04N 9/12* (2006.01)

(52) U.S. Cl. .................. 348/383; 348/744
(58) Field of Classification Search ............ 348/383, 348/745, 746; 345/1.3, 32, 690; H04N 5/66, H04N 9/12
See application file for complete search history.

(56) References Cited

U.S. PATENT DOCUMENTS

| 4,974,073 | A | 11/1990 | Inova |
| 5,136,390 | A | 8/1992 | Inova et al. |
| 6,340,976 | B1 * | 1/2002 | Oguchi et al. ............ 345/690 |
| 6,480,175 | B1 * | 11/2002 | Schneider ................. 345/32 |
| 6,717,625 | B1 * | 4/2004 | Thielemans ............... 348/745 |
| 6,804,406 | B1 * | 10/2004 | Chen ........................ 382/254 |
| 6,999,133 | B2 * | 2/2006 | Krogstad et al. .......... 348/746 |

* cited by examiner

*Primary Examiner*—Trang U. Tran
(74) *Attorney, Agent, or Firm*—Birch, Stewart, Kolasch & Birch, LLP

(57) ABSTRACT

A remote control method of tile display is disclosed for a tile display system, which contains a host computer, several projector modules, and a screen. The images produced by the projector modules are simultaneously displayed on the screen as a single image. The remote control method includes the steps of: obtaining setting parameters of each projector using a control program on the host computer via a network; storing the setting parameters of each projector in a storage module of the host computer; simultaneously generating a projector parameter table for each projector; updating the projector parameter table when the parameters of any projector are modified; generating a control message for the corresponding projector according to the new parameter table; transmitting the control message to the corresponding projector via the network; and converting the control message into one recognizable by the projector in order to make corresponding modifications.

18 Claims, 3 Drawing Sheets

REMOTE CONTROL METHOD OF TILE DISPLAY

BACKGROUND OF THE INVENTION

1. Field of Invention

The invention relates to a control method of tile display used in a system that simultaneously displays multiple images. In particular, it relates to a remote control method of tile display.

2. Related Art

The tile display system refers to a display system that combines more than one display devices. The display system can divides a single image into many image blocks, each of which is produced by a single display device. All the image blocks are then combined into a single and complete image. The image thus generated has the advantages of having a bigger size, a brighter image, and a higher resolution than using a single display device. For example, such a tile display system may be a TV wall, which can display a single and complete image. The image can be divided into several image blocks, each of which is generated by on TV. Moreover, the display device in the tile display system can be various kinds of projectors or TV's. In comparison with the single display device, the image thus generated has the advantages of having a bigger size, a brighter image, and a higher resolution than using a single display device. Furthermore, the image size and depth can be increased without sacrificing the brightness. Therefore, it is often used in the displays of high-tech companies or government institutes.

In addition to breaking a single complete image into many image blocks, there are also control techniques of tile display systems that combine individually generated images into a single complete image. In particular, the latter techniques have to consider three things. First, the display devices have to be accurately positioned so that there is no gap among image blocks. Secondly, one has to match each individual image block with its adjacent image blocks so that the whole image is complete and continuous. Thirdly, the color and brightness of the display devices have to be tuned so that the whole image is harmonious.

Currently there are methods for solve the above-mentioned problems. For example, one can arrange partial overlap among the image blocks to eliminate gaps and to make them continuous. Calibration factors are also used to make the color and brightness of adjacent image blocks consistent, minimizing the discontinuity between each two adjacent image blocks. Another method uses the brightness average to make the brightness of the whole image consistent. In short, the ultimate goal is to combine images generated by each individual display device into a complete single continuous image, which looks like a magnified image generated by a single projecting device. There are many methods that eliminate gaps the discontinuities between two adjacent image blocks, including the U.S. Pat. No. 4,974,073 and U.S. Pat. No. 5,136,390.

In the above-mentioned tile display system, whether the displayed image is three-dimensional or planar is determined by the design of each component display device. For example, some manufacturers use two projectors to generate a three-dimensional image, while other only use one projector to achieve the same effect. However, in either planar or three-dimensional displays, one always encounters the problems of discontinuity, color inhomogeneity, and brightness inconsistency. In these cases, each individual display device has to be adjusted. However, the adjustment is time consuming and often unsatisfactory if the tile display system contains many display devices. Therefore, it is imperative to have an effective and simple method that can control each of the display devices in the tile display system and each image block thus generated, producing a continuous image consistent in color and brightness.

SUMMARY OF THE INVENTION

In view of the foregoing, an objective of the invention is to provide a remote control method of the tile display system. The method can easily control the properties of each component image so that the whole image is complete and continuous. Moreover, the color and brightness of this image is consistent. That is, the disclosed method can produce a single image that is continuous and consistent in color and brightness.

The disclosed remote control method of tile display is used in a tile display system that includes a host computer, several projector modules, and a screen. The images generated by individual projector modules are simultaneously displayed on the screen to form a single image. The control method includes the steps of: obtaining setting parameters of each projector using a control program on the host computer via a network; storing the setting parameters of each projector in a storage module of the host computer; simultaneously generating a projector parameter table for each projector; updating the projector parameter table when the parameters of any projector are modified; generating a control message for the corresponding projector according to the new parameter table; transmitting the control message to the corresponding projector via the network; and converting the control message into one recognizable by the projector in order to make corresponding modifications.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The tile display system of the invention can divide a single image into different numbers of image blocks, each of which is then produced by a single projector. For example, the invention can break a single image into 3*4 or 4*6 image blocks. Each image block is generated by a projector or display module. Therefore, the system needs 12 and 24 projectors or display modules to generated 3*4 and 4*6 image blocks, respectively. Each projector contains at least one projector and one computer system; likewise, each display device module contains at least one display device and a computer system. The display device can be a liquid crystal screen, a plasma screen, or a cathode ray tube (CRT) screen. For example, a projector module can contain either two projectors and a computer or a projector and a computer. According to the design of the projector, the image block can be three-dimensional or planar.

Figure 1:
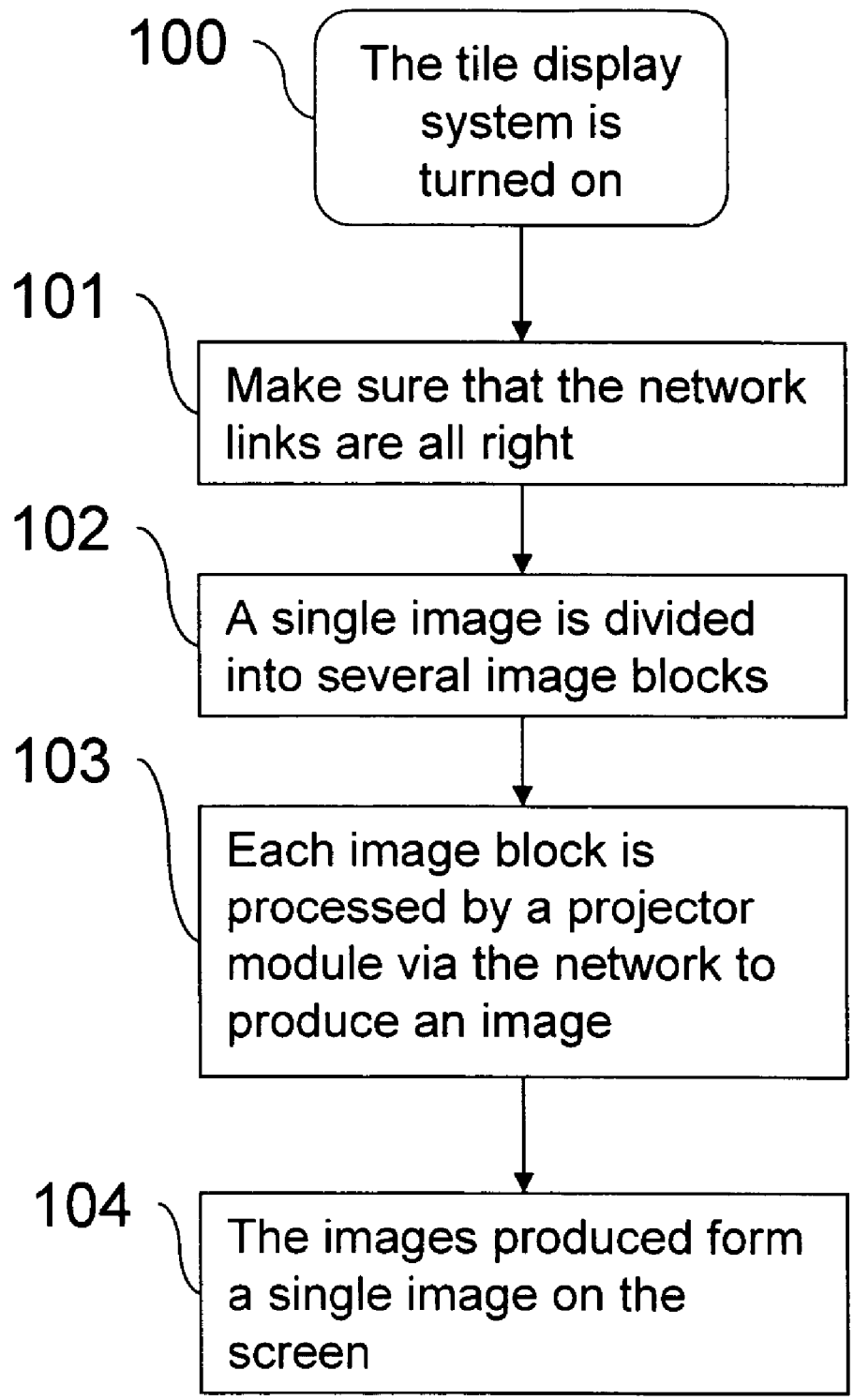
FIG. 1 is a flowchart of a conventional tile display method.
Figure 2:
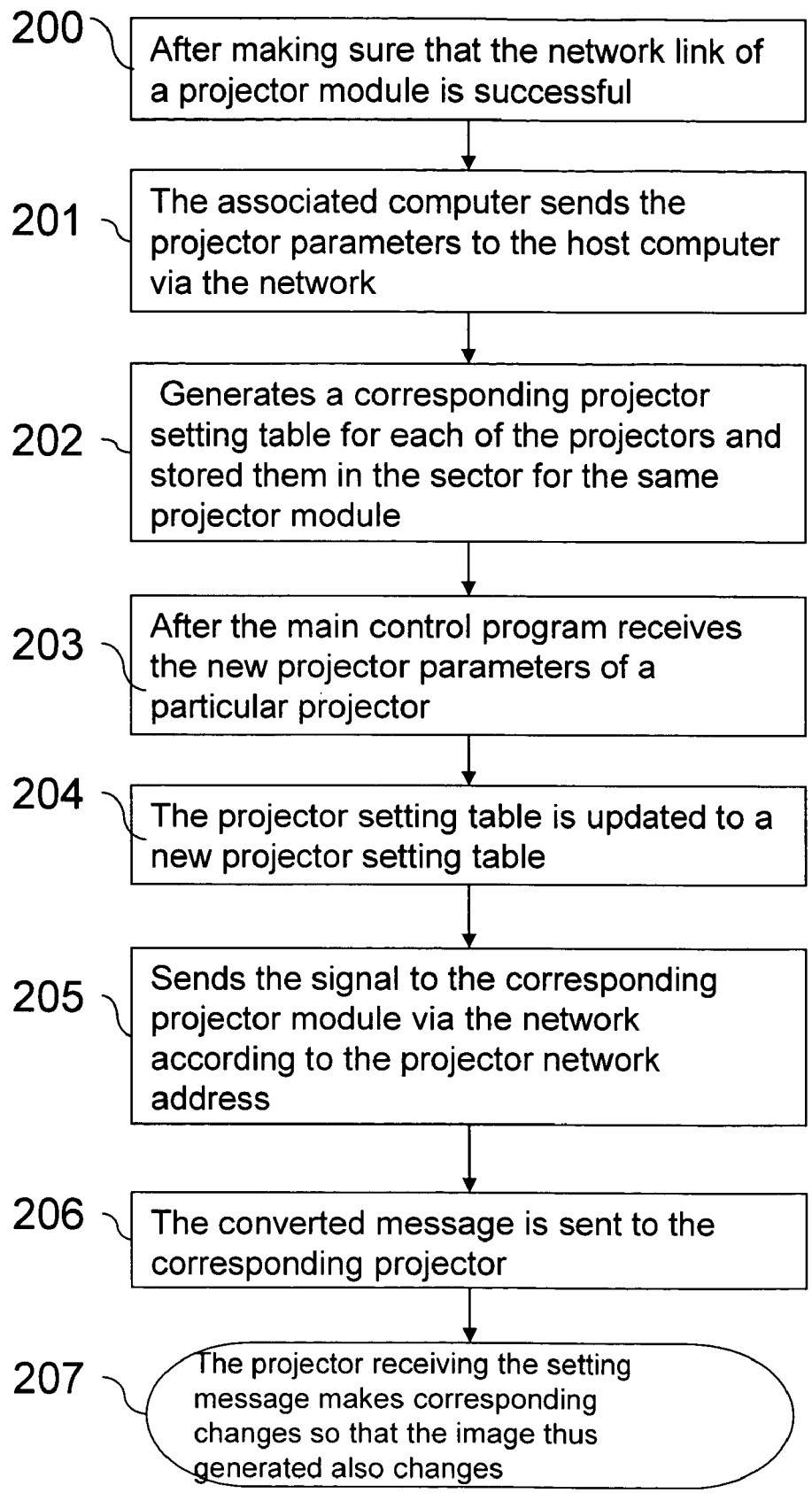
FIG. 2 is a flowchart of the remote control method of a tile display system according to a preferred embodiment of the invention.

In the following paragraphs, we use FIGS. 1 and 2 to explain a preferred embodiment of the disclosed method. In this embodiment, the tile display system contains a host computer, several projector modules, and a screen. As shown in FIG. 1, after the tile display system is turned on (step 100), a main control program in the host computer establishes network links with each of the projector modules according to the corresponding network address setting. After making sure that the network links are all right (step 101), the system starts to process images. In this process, a single image is divided into several image blocks (step 102). Each image block is processed by a projector module via the network to produce an image (step 103). Since the projector modules are carefully positioned, the images thus produced form a single image on the screen (step 104). The system power on process includes the power on of the host computer, the projector in the projector module, and the associated computer. The network linking and data transmissions between the host computer and all the projector modules are achieved by a network control program. If the network link of a particular projector module is out of order, a warning message is sent out and no image is processed and generated from this projector module.

At the same time of producing a single image, the disclosed method further includes the following steps. As shown in FIG. 2, after making sure that the network link of a projector module is successful (step 200), the system obtains the parameters of this projector module. During this process, the main control program obtains the parameters of the projector from the associated computer of the projector module. After the projector parameters are converted into a computer recognizable message using a parameter conversion program, the message is stored in the associated computer. Once receiving a command from the main control program, the associated computer sends the projector parameters to the host computer via the network (step 201). The parameter conversion program is used to generate computer recognizable projector parameters. It is also responsible for letting the projector understand a command from the main control program.

After the host computer obtain the parameters of a projector module via the network, it stores them in a storage module and generates a corresponding projector setting table for each of the projectors in the projector module. The data of each projector setting table are stored in the sector for the same projector module (step 202). For example, if a projector module contains two projectors, the parameters of these two projectors are considered as the data of the same projector module and stored in the storage module. Suppose a single image is composed of twelve image blocks, each image block is generated by a projector. If each projector module has two projectors, then the host computer has 24 projector setting tables, grouped into 12 projector modules.

According to the above description, the user can set parameters according the settings of each projector. After the main control program receives the new projector parameters of a particular projector (step 203), the parameters are stored in the sector for the corresponding projector module in the storage module. At the same time, the projector setting table is updated to a new projector setting table (step 204). Afterwards, the main control program generates a projector setting signal according to the new projector setting table, and sends the signal to the corresponding projector module via the network according to the projector network address (step 205). After the signal is transmitted to the projector module, the associated computer of the projector module converts the parameters into a projector recognizable message. Finally, the converted message is sent to the corresponding projector (step 206). The projector receiving the setting message makes corresponding changes so that the image thus generated also changes (e.g., making the color more bluish, making the image darker, and shifting the image to the right a little bit) (step 207). According to the above description, the user can readily achieve the consistency in the color and brightness of each image block, rendering a complete and consistent image from the 12 image blocks.

In the disclosed method, the data transmission between any projector module and the host computer is through a network and a network control program. The network can be wired or wireless. The projector settings mentioned above can include the image brightness, contrast, color strength (in RGB components), and image settings (such as image positions, sizes, and phases). The projector setting parameters are converted by the parameter conversion program into a computer recognizable message. The parameters in the projector setting tables are also converted by the same parameter conversion program into a projector recognizable message.

Figure 3:
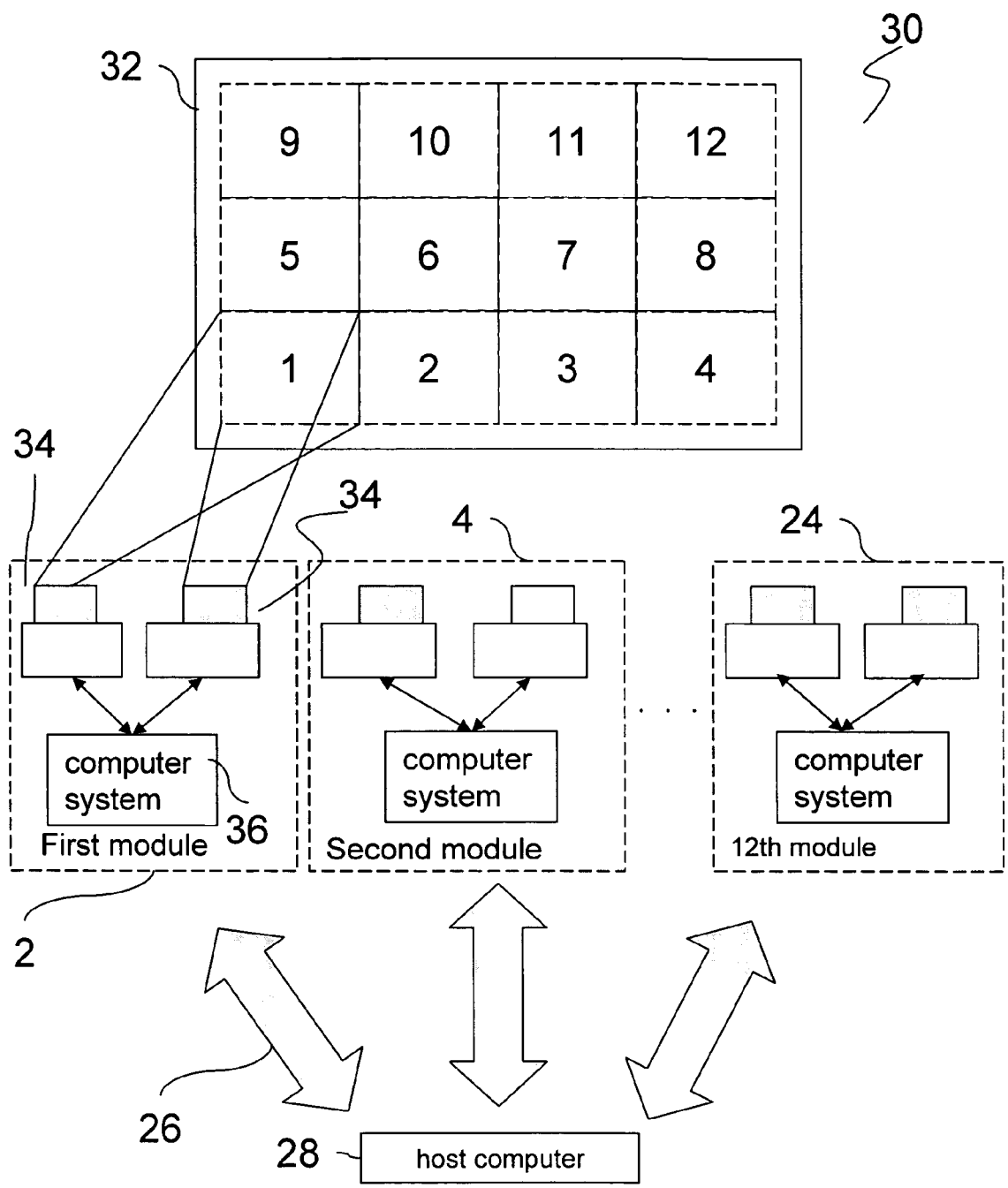
FIG. 3 is a preferred system structure using the disclosed method.

In FIG. 3, we use a tile display system 30 with 12 image blocks as an example to explain the disclosed system. In the embodiment of FIG. 3, the system 30 contains a screen 32, 12 projector modules 2, 4, . . . , 24 and a host computer 28. The image on the screen 32 is composed of 12 image blocks, each of which is generated by one of the projector modules 2, 4, . . . , 24. Each of the projector modules 2, 4, . . . , 24 can contain more than one projector 34 to provide the desired image and a computer system 36 to control the projectors 34. The generated image can be three-dimensional or planar, depending upon the settings of the projectors 34. In this embodiment, we suppose each of the projector modules 2, 4, . . . , 24 has two projectors 34 to generate three-dimensional images. We thus need 12 projector modules 2, 4, . . . , 24 (i.e. 24 projectors) to generate a single three-dimensional image from 12 image blocks. We also need 12 computers to connect to each projector in the corresponding projector module, controlling the settings of each projector. In other words, each computer has to control two projectors. In addition, there is a host computer 28 for a user to control each of the projector modules 2, 4, . . . , 24 via a network 26. Each projector is controlled by the associated computer in the projector module. The user can quickly receive responses from a particular projector regarding his or her input of the parameters for the projector. Each computer contains a projector parameter conversion program and a network control program. The parameter conversion program is used to convert projector setting parameters into a command recognizable by the projector in order to control the projector and projector setting parameters into a computer recognizable message. The network control program controls the data transmissions between each projector module and the host computer via the network 26.

Moreover, the invention can be applied to a tile display system with a color and brightness detector (not shown). The color and brightness detector detects the color and brightness of each image block. Using the invention, the detected color and brightness are changed into numerical data which are then transmitted via the network to the host computer. The host computer generates a color/brightness table for each image block, whose modification is sent to the projector via the network, converted into a message recognizable by the projector. The images therefore change their properties accordingly (for example, the color getting bluish or the brightness getting darker). On the other hand, the tile display system of the invention can include a server, which is connected to the computers in the 12 projector modules and the host computer through a wired or wireless network. It is used for huge data access and processing, such as for the process of dividing a single image into several image blocks.

Certain variations would be apparent to those skilled in the art, which variations are considered within the spirit and scope of the claimed invention.

What is claimed is:

1. A remote control method of tile display for a tile display system that contains a host computer, a plurality of projector modules, and a screen, the images generated by the projector modules are simultaneously displayed on the screen as a single image, wherein the remote control method comprises the steps of:
    (a) simultaneously extracting projector setting parameters in each of the projector modules;
    (b) storing the projector setting parameters of each of the projectors in a storage module of the host computer according to the projector module it belongs and generating a projector setting table for each of the projectors;
    (c) updating the projector setting table of a particular projector when its new projector setting parameters are received and converting the new projector setting parameters into a projector control message recognizable by the projector; and
    (d) making changes on the image generated by the projector according to the projector control message.

2. The remote control method of claim 1, wherein step (a) further includes the step of obtaining projector setting parameters of each of the projectors from an associated computer in each of the projector modules via a network.

3. The remote control method of claim 1, wherein step (a) is preceded by the step of converting projector setting parameters in each of the projector modules into a computer recognizable message and storing them into the associated computer in each of the projector modules.

4. The remote control method of claim 1, wherein the projector setting parameters of each of the projectors includes image brightness, contrast, color strength, and image settings.

5. The remote control method of claim 4, wherein the image settings include image positions, sizes, and phases.

6. The remote control method of claim 3, wherein the step of converting projector setting parameters in each of the projector modules into a computer recognizable message is implemented by a parameter conversion program in the projector module.

7. The remote control method of claim 6, wherein the parameter conversion program is also used to convert the projector setting parameters in the projector setting tables into a projector recognizable message.

8. The remote control method of claim 1, wherein the step (c) of updating the projector setting table of a particular projector when its new projector setting parameters are received is implemented by a main control program in the host computer.

9. A remote control method of tile display for a tile display system that contains a host computer, a plurality of projector modules, a color/brightness detector, and a screen, the images generated by the projector modules are simultaneously displayed on the screen as a single image, wherein the remote control method comprises the steps of:
    (a) simultaneously extracting projector setting parameters in each of the projector modules and obtaining the color and brightness of each of the image blocks;
    (b) storing the projector setting parameters of each of the projectors and the color and brightness of each of the image blocks in a storage module of the host computer according to the projector module it belongs and generating a projector setting table for each of the projectors;
    (c) updating the projector setting table of a particular projector when its new projector setting parameters are received and converting the new projector setting parameters into a projector control message recognizable by the projector; and
    (d) making changes on the image generated by the projector according to the projector control message.

10. The remote control method of claim 9, wherein step (a) further includes the step of obtaining projector setting parameters of each of the projectors from an associated computer in each of the projector modules via a network.

11. The remote control method of claim 9, wherein step (a) is preceded by the step of converting projector setting parameters in each of the projector modules into a computer recognizable message and storing them into the associated computer in each of the projector modules.

12. The remote control method of claim 9, wherein step (a) further includes the step of obtaining the color/brightness of each of the image blocks using the color/brightness detector.

13. The remote control method of claim 9, wherein the projector setting parameters of each of the projectors includes image brightness, contrast, color strength, and image settings.

14. The remote control method of claim 13, wherein the image settings include image positions, sizes, and phases.

15. The remote control method of claim 11, wherein the step of converting projector setting parameters in each of the projector modules into a computer recognizable message is implemented by a parameter conversion program in the projector module.

16. The remote control method of claim 15, wherein the parameter conversion program is also used to convert the projector setting parameters in the projector setting tables into a projector recognizable message.

17. The remote control method of claim 9, wherein the step (c) of updating the projector setting table of a particular projector when its new projector setting parameters are received is implemented by a main control program in the host computer.

18. The remote control method of claim 9, wherein a server is used to connect the projector module to the host computer through a wired or wireless network.

* * * * *